United States Patent Office 3,418,164
Patented Dec. 24, 1968

3,418,164
FILAMENT WIRE FOR USE IN THE CATHODE OF A THERMIONIC VALVE
Henri Provisor, Suresnes, France, assignor to North American Philips Company, Inc., New York, N.Y., a corporation of Delaware
No Drawing. Continuation of application Ser. No. 331,762, Dec. 19, 1963. This application Jan. 19, 1968, Ser. No. 699,272
Claims priority, application France, Feb. 6, 1963, 923,898
5 Claims. (Cl. 117—215)

ABSTRACT OF THE DISCLOSURE

An indirectly heated cathode having a filament coated with alumina and a layer of zirconium, niobium, tantalum or titanium to reduce leakage and failure between the cathode and filament.

---

This is a continuation of application Ser. No. 331,762, filed Dec. 19, 1963, now abandoned.

The invention relates to a filament wire of an indirectly heated cathode, the electron-emissive surface of which is formed by an alkaline earth oxide layer or a layer containing such oxides, said cathode being employed, as is known, in numerous types of thermionic tubes.

In accordance with the invention the risk of breakdown between the filament and the cathode during the operation of the tubes is reduced, while the stray current between the filament and the cathode is lower than in the conventional tubes. The invention relates principally to the application of an additional layer of at least one element having an oxygen-binding power, which element does not reduce alumina at the operational temperature of the filament and has a low vapor pressure, while the oxides of said element are resistant to alumina at the said operational temperatures, suitable elements to this end are Zr, Nb, Ta, and to a lesser extent also Ti. The additional layer may be applied directly to the filament, i.e. beneath the alumina layer or to this insulating alumina layer.

The invention provides furthermore a method of applying a layer of the said elements and relates to thermionic tubes comprising an indirectly heated cathode having a filament provided with such a layer.

Previous investigations have disclosed the role of oxygen in the deterioration of the insulation of the alumina layer. If the voltage applied between the filament and the cathode is such that the cathode is negative with respect to the filament, the oxygen reacts with the tungsten, so that a volatile oxide is produced, which condenses and decomposes at the surface of the alumina particles. The released oxygen again attacks the tungsten wire, forms a new oxide molecule of this metal, which volatilizes, condenses and again decomposes. The cycle is repeated as long as the released oxygen is not bound somewhere in the form of a stable compound. The accumulation of metallic tungsten atoms from the oxide molecules between the alumina particles changes the insulating resistance of the alumina. The production of metallic deposits at the contact area between the filament and the cathode proves that the tungsten is transferred in the form of positive ions. However, it is possible that the oxygen released by the decomposition of tungsten oxide should flow towards the positive filament under the action of a negative charge.

From the foregoing it will be apparent that the application of given oxygen-binding elements to the tungsten filament insulated by the alumina layer, must have a favorable effect on the maintenance of the insulating properties of the alumina. Among the elements providing a resistant oxide only those are suitable which have a low vapor pressure and the oxide of which does not form with the alumina a compound of moderate electrical resistance or a low-melting point eutectic. Moreover, at the operational temperature the element should not reduce the alumina. These requirements restrict the choice to a few elements, for example zirconium, niobium, tantalum and titanium.

The invention uses one of these elements or a few of them, independently of the theory set out above.

The use of the said elements in the form of the hydride is particularly simple, which provides a double advantage: on the one hand the metal filaments can be coated by electrophoresis and on the other hand there is obtained a protection of the elements strongly reacting with oxygen from oxidation during the sintering of the alumina on the tungsten filament.

Zirconium hydride is deposited on a tungsten wire by cataphoresis from a suspension of 100 gms. of $ZrH_2$ in 2000 mls. of isopropyl alcohol and 40 mls. of $NiCl_2 \cdot 0.2$ N. After drying of the deposit, the filament is coated with alumina in a conventional manner. The sintering of the alumina does not exhibit any visible change with the use of zirconium hydride which sticks to the tungsten wire.

A filament provided with a layer of oxygen-binding elements on the outer surface of the insulating alumina sheath may be manufactured as follows. In a conventional manner the alumina layer is deposited on the tungstern wire. On this first coating there is deposited a alyer of the selected hydride. At this same time the two layers are sintered at a high temperature in a reducing atmosphere.

Satisfactory results are obtained by using titanium hydride. After the application of the alumina layer on the tungsten wire by cataphoresis, a suspension of a mixture of titanium and alumina in collodium was applied by spraying. It has been found to be advantageous to use a suspension of the following composition: 100 gms. of $Al_2O_3$, 20 gms. of $TiH_2$ in 200 mls. of collodium, diluted with 110 mls. of methanol. The collodium was a solution of 2.50 gms. of nitro-cellulose in 75 gms of glycol ethylene and 22.5 gms. of butanol.

The first alumina layer and the deposit obtained by spraying are simultaneously sintered under the conditions usually prevailing in sintering the insulating alumina sheath. This provides a black filament without deterioration of the insulating properties of the alumina at the contact area with the tungsten wire.

A filament thus manufactured combines the advantages of the presence of an oxygen-binding element and of the thermal radiation of a black body. The heat transfer by radiation is materially greater owing to the metallic titanium released from the hydride.

I claim:

1. In an indirectly heated cathode for an electron discharge tube, said cathode having an electron emissive surface constituted by a layer of alkaline earth oxide, a filament wire for heating said cathode to a temperature at which the cathode emits electrons having thereon an insulating layer of alumina between the wire and the electron emissive layer and a layer adjacent to said insulating layer of an element having a high-oxygen binding capacity and which does not reduce alumina at the temperature at which the cathode emits electrons and which has a low vapor pressure and an oxide which is resistant to alumina at said temperature, said element being selected from the group consisting of zirconium, niobium, tantalum, and titanium.

2. A cathode as claimed in claim 1 in which the layer of the element is over the alumina layer.

3. A cathode as claimed in claim 1 in which the layer of the element is between the filament and the alumina layer.

4. A cathode as claimed in claim 2 in which the filament is tungsten.

5. A cathode as claimed in claim 4 in which the layer of the element consists of a hydride of the element.

References Cited

UNITED STATES PATENTS

| | | | |
|---|---|---|---|
| 1,958,967 | 5/1934 | Kniepen | 117—221 X |
| 2,798,010 | 7/1957 | Bender | 117—219 X |
| 3,029,360 | 4/1962 | Etter | 313—340 |
| 3,134,691 | 5/1964 | Kopecky | 117—215 |
| 3,161,540 | 12/1964 | Kingsley et al. | 117—217 |
| 3,195,004 | 7/1965 | Hassett | 117—231 X |

FOREIGN PATENTS 891,705  3/1962  Great Britain.

ALFRED L. LEAVITT, *Primary Examiner.*

C. K. WEIFFENBACH, *Assistant Examiner.*

U.S. Cl. X.R.

117—217, 221, 231; 313—345